United States Patent
Yanagihara et al.

(10) Patent No.: US 11,422,321 B2
(45) Date of Patent: Aug. 23, 2022

(54) OPTICAL FIBER CONNECTION COMPONENT AND OPTICAL DEVICE MANUFACTURING METHOD

(71) Applicant: Nippon Telegraph and Telephone Corporation, Tokyo (JP)

(72) Inventors: Ai Yanagihara, Musashino (JP); Shuichiro Asakawa, Musashino (JP); Kota Shikama, Musashino (JP); Yusuke Muranaka, Musashino (JP); Hidetaka Nishi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/972,872

(22) PCT Filed: May 23, 2019

(86) PCT No.: PCT/JP2019/020461
§ 371 (c)(1),
(2) Date: Dec. 7, 2020

(87) PCT Pub. No.: WO2019/239839
PCT Pub. Date: Dec. 19, 2019

(65) Prior Publication Data
US 2021/0247575 A1    Aug. 12, 2021

(30) Foreign Application Priority Data

Jun. 11, 2018 (JP) .............................. JP2018-111417

(51) Int. Cl.
*H04B 10/00* (2013.01)
*G02B 6/42* (2006.01)

(52) U.S. Cl.
CPC ........... *G02B 6/4238* (2013.01); *G02B 6/428* (2013.01); *G02B 6/4249* (2013.01); *G02B 6/4292* (2013.01)

(58) Field of Classification Search
CPC combination set(s) only.
See application file for complete search history.

(56) References Cited

U.S. PATENT DOCUMENTS 4,639,074 A * 1/1987 Murphy .................. G02B 6/30
                                                                385/49
5,006,201 A * 4/1991 Kaukeinen ............... G02B 6/06
                                                                216/24
(Continued)

FOREIGN PATENT DOCUMENTS

JP      H11-109186 A    4/1999
JP      2002122751 A    4/2002
(Continued)

OTHER PUBLICATIONS

H. Tanobe et al., *Compact 100Gb/S DP-QPSK Integrated Receiver Module Employing Three-Dimensional Assembly Technology*, Optics Express, vol. 22, Issue 5, pp. 6108-6113 (2014).
(Continued)

*Primary Examiner* — Agustin Bello
(74) *Attorney, Agent, or Firm* — Workman Nydegger

(57) ABSTRACT

Provided is an optical fiber connection component in which an optical waveguide of a planar lightwave circuit and an optical fiber can be connected after a process using SMT and reflow mounting technology. The optical fiber connection component includes: a plurality of fiber guide holes into which optical fibers are insertable at intervals equal to intervals of a plurality of optical waveguides of the planar lightwave circuit; and grooves for demarcating an area provided with the plurality of fiber guide holes and an area coated with an adhesive in an end surface to be joined with
(Continued)

the planar lightwave circuit. The plurality of optical waveguides and the plurality of fiber guide holes are respectively aligned and fixed to the planar lightwave circuit with the adhesive in advance.

2 Claims, 8 Drawing Sheets

(56) References Cited

U.S. PATENT DOCUMENTS

| | | | | |
|---|---|---|---|---|
| 5,214,730 A * | 5/1993 | Nagasawa | G02B 6/3821 | 385/59 |
| 5,296,072 A * | 3/1994 | Dannoux | G02B 6/30 | 156/257 |
| 5,557,695 A * | 9/1996 | Yamane | G02B 6/30 | 385/147 |
| 5,625,730 A * | 4/1997 | Ishikawa | G02B 6/30 | 385/49 |
| 6,163,639 A * | 12/2000 | Ollier | G02B 6/30 | 385/14 |
| 6,398,424 B1 * | 6/2002 | Jin | G02B 6/3696 | 385/59 |
| 6,768,850 B2 * | 7/2004 | Dugan | G02B 6/122 | 385/124 |
| 6,866,426 B1 * | 3/2005 | Steinberg | G02B 6/30 | 385/65 |
| 6,874,950 B2 * | 4/2005 | Colgan | G02B 6/3636 | 385/31 |
| 7,197,224 B2 * | 3/2007 | Rolston | G02B 6/3839 | 385/137 |
| 7,292,756 B2 * | 11/2007 | Moynihan | G02B 6/1221 | 385/49 |
| 7,366,380 B1 * | 4/2008 | Peterson | G02B 6/4214 | 385/47 |
| 7,729,581 B2 * | 6/2010 | Rolston | G02B 6/4292 | 385/52 |
| 7,876,988 B2 * | 1/2011 | Yasuda | G02B 6/3636 | 385/49 |
| 9,028,156 B2 * | 5/2015 | Ishigami | G02B 6/4284 | 385/92 |
| 9,086,547 B2 * | 7/2015 | McColloch | G02B 6/3839 | |
| 9,229,169 B2 * | 1/2016 | Doany | G02B 6/30 | |
| 9,423,561 B1 * | 8/2016 | Chou | G02B 6/30 | |
| 9,529,155 B2 * | 12/2016 | Bhagavatula | G02B 6/3885 | |
| 9,651,747 B1 * | 5/2017 | Barwicz | G02B 6/4292 | |
| 9,772,454 B2 * | 9/2017 | Droesbeke | G02B 6/3847 | |
| 10,101,541 B2 * | 10/2018 | Nakama | G02B 6/3853 | |
| 10,191,216 B2 * | 1/2019 | Evans | G02B 6/26 | |
| 10,228,520 B2 * | 3/2019 | Evans | G02B 6/4292 | |
| 10,656,339 B2 * | 5/2020 | Patel | G02B 6/30 | |
| 10,996,405 B2 * | 5/2021 | Patel | G02B 6/3897 | |
| 2002/0110335 A1 | 8/2002 | Wagner et al. | | |
| 2002/0196998 A1 * | 12/2002 | Steinberg | G02B 6/30 | 385/14 |
| 2003/0048997 A1 * | 3/2003 | Nobuhara | G02B 6/4246 | 385/84 |
| 2003/0081926 A1 * | 5/2003 | Jeong | G02B 6/30 | 385/137 |
| 2003/0095758 A1 * | 5/2003 | Morse | G02B 6/30 | 385/89 |
| 2003/0133688 A1 * | 7/2003 | Wing Leung | G02B 6/3885 | 385/137 |
| 2003/0133689 A1 * | 7/2003 | Jeong | G02B 6/3652 | 385/137 |
| 2003/0142922 A1 * | 7/2003 | Dallas | G02B 6/30 | 385/83 |
| 2004/0042730 A1 * | 3/2004 | Freund | G02B 6/4226 | 385/52 |
| 2004/0165854 A1 * | 8/2004 | Niiyama | G02B 6/3652 | 385/137 |
| 2005/0018993 A1 * | 1/2005 | Rolston | G02B 6/4249 | 385/137 |
| 2005/0163431 A1 * | 7/2005 | Moynihan | G02B 6/1221 | 385/60 |
| 2005/0180696 A1 * | 8/2005 | Takahashi | G02B 6/30 | 385/49 |
| 2005/0238290 A1 * | 10/2005 | Choudhury | G02B 6/30 | 385/59 |
| 2005/0254770 A1 * | 11/2005 | Watanabe | G02B 6/3636 | 385/49 |
| 2006/0291793 A1 * | 12/2006 | Carpenter | G02B 6/3652 | 385/137 |
| 2011/0075965 A1 * | 3/2011 | DeMeritt | G02B 6/4214 | 385/14 |
| 2014/0147078 A1 * | 5/2014 | Bhagavatula | G02B 6/32 | 385/33 |
| 2014/0301700 A1 * | 10/2014 | Matsubara | G02B 6/40 | 385/54 |
| 2015/0192745 A1 * | 7/2015 | Yamazaki | G02B 6/4292 | 385/83 |
| 2016/0011373 A1 * | 1/2016 | Barwicz | G02B 6/3636 | 385/139 |
| 2016/0216459 A1 * | 7/2016 | Matsubara | G02B 6/3893 | |
| 2017/0131491 A1 * | 5/2017 | Seyoum | G02B 6/4279 | |
| 2018/0059331 A1 * | 3/2018 | Evans | G02B 6/32 | |
| 2018/0172905 A1 * | 6/2018 | Fortusini | G02B 6/125 | |
| 2018/0246279 A1 * | 8/2018 | Florian Lohse | G02B 6/1228 | |
| 2018/0267255 A1 * | 9/2018 | Butler | G02B 6/3885 | |
| 2019/0094460 A1 * | 3/2019 | Brusberg | G02B 6/3885 | |
| 2019/0219772 A1 * | 7/2019 | Li | G02B 6/3822 | |
| 2019/0384007 A1 * | 12/2019 | Matiss | G02B 6/262 | |
| 2020/0073066 A1 * | 3/2020 | Hirano | G02B 6/3652 | |
| 2021/0247575 A1 * | 8/2021 | Yanagihara | G02B 6/4249 | |

FOREIGN PATENT DOCUMENTS

| | | |
|---|---|---|
| JP | 2003248143 A | 9/2003 |
| JP | 2014-010334 A | 1/2014 |
| JP | 2015-129795 A | 7/2015 |
| JP | 2017054110 A | 3/2017 |

OTHER PUBLICATIONS

C. Doerr et al., *Silicon Photonics Coherent Transceiver in a Ball-Grid Array Package*, OFC 2017, Th5D.5, pp. 1-3.

* cited by examiner

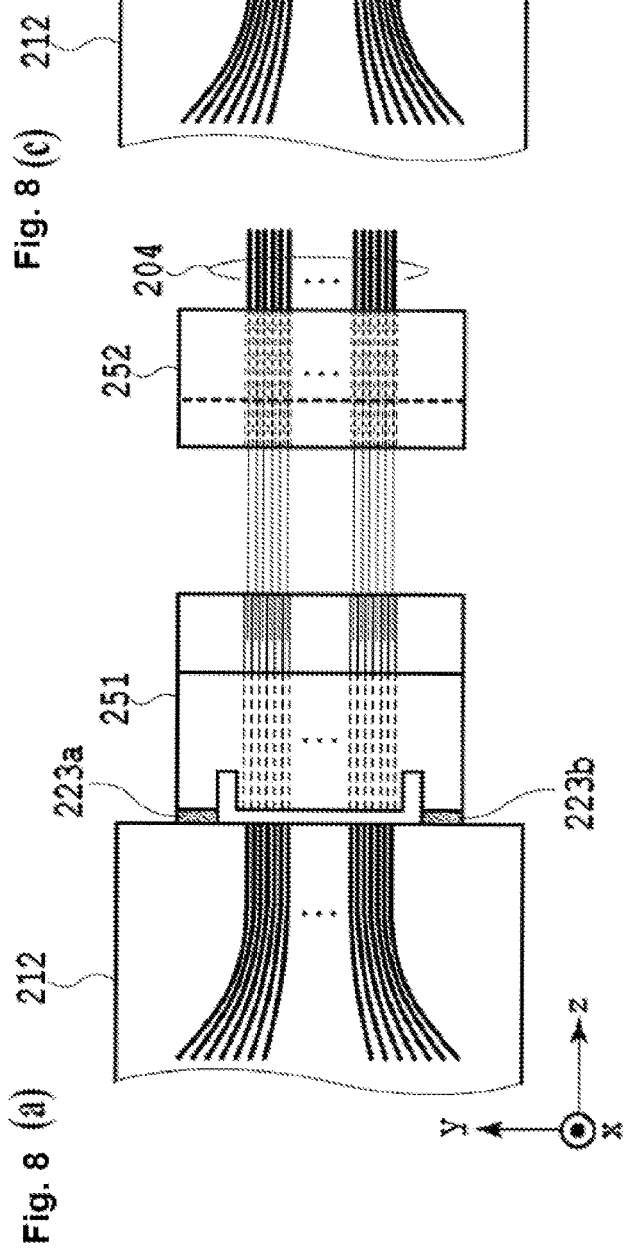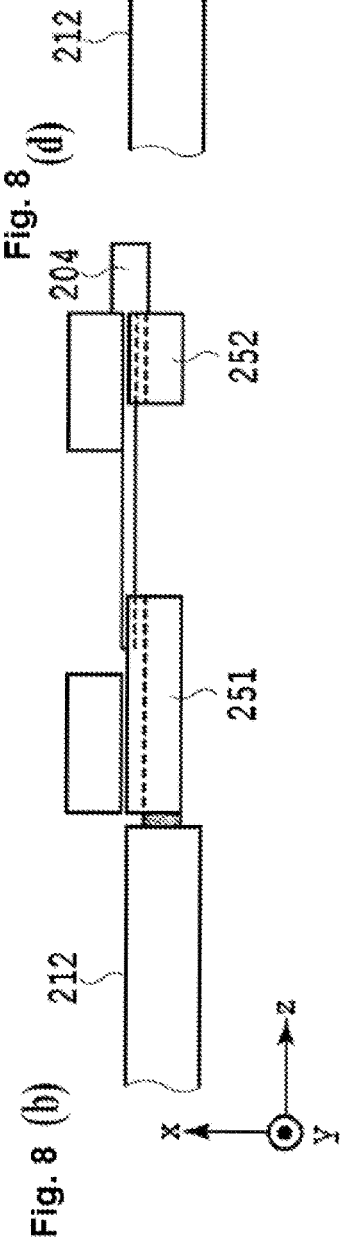

OPTICAL FIBER CONNECTION COMPONENT AND OPTICAL DEVICE MANUFACTURING METHOD

TECHNICAL FIELD

The present invention relates to an optical fiber connection component and an optical device manufacturing method and more particularly to a connection component for connecting a planar lightwave circuit included in an optical module mounted on a BGA package and an optical fiber, and an optical device manufacturing method in which the optical module including the planar lightwave circuit is mounted on the BGA package.

BACKGROUND ART

In recent years, with the spread of the Internet of things (IoT) and the expansion of cloud services, communication traffic rapidly increases, and the large capacity of optical communication networks is in progress. Further, in parallel with the large capacity of optical communication networks, the economization is also in progress, and an optical transmission/reception module such as a coherent receiver and an optical device such as a multicast optical switch which are components are required to be reduced in cost and improved in mass productivity. As one approach to realize the economization of optical modules for communication, attention is paid to the mounting form of integrating optical devices on a ball grid arrays (BGA) package (for example, see Non-Patent Literatures 1 and 2).

A main advantage of integrating optical devices on the BGA package is that a method of mounting optical devices on a printed circuit board becomes excellent in mass productivity. In the related art, the optical devices are housed in a butterfly package or the like. The optical devices are placed one by one on the printed circuit board, and then mounted by fixing the positions by screwing and soldering many lead pins on the side surface of the package one by one to a wiring pattern on the circuit board. On the other hand, when the optical devices are housed in the BGA package, the optical devices are automatically mounted at a high speed on the printed circuit board by surface mounted technology (SMT) generally used in electronic devices, and then a plurality of solder balls on the bottom surface of the BGA can be soldered collectively by a reflow furnace.

When the optical devices are housed in the BGA package, a footprint on the printed circuit board can be reduced, and the electronic devices and the optical devices can be mounted densely, whereby excellent high frequency characteristics can be expected. Accordingly, in order to reduce the cost of the optical devices and improve the mass productivity, desirably, the optical devices integrated on the BGA package are mounted on the printed circuit board by reflow mounting technology. The examples of the application destination of the optical devices integrated on the BGA package include a coherent receiver, an optical transceiver, and a digital coherent transmission/reception module and the like.

CITATION LIST

Non-Patent Literature

Non-Patent Literature 1: H. Tanobe, Y. Kurata, Y. Nakanishi, H. Fukuyama, M. Itoh, and E. Yoshida, "Compact 100 Gb/s DP-QPSK integrated receiver module employing three-dimensional assembly technology," OPTICS EXPRESS, Vol. 22, Issue 5, pp. 6108-6113 (2014)

Non-Patent Literature 2: C. Doerr, J. Heanue, L. Chen, R. Aroca, S. Azemati, G. Ali, G. McBrien, Li Chen, B. Guan, H. Zhang, X. Zhang, T. Nielsen, H. Mezghani, M. Mihnev, C. Yung, and M. Xu, "Silicon Photonics Coherent Transceiver in a Ball-Grid Array Package," OFC2017, Th5D.5

SUMMARY OF THE INVENTION

Technical Problem

However, in a case where the reflow mounting technology is applied to the optical devices integrated on the BGA package, in the configuration described in Non-Patent Literatures 1 and 2, the optical fiber connected to the planar lightwave circuit has the problem described below.

In a conventional optical module, a pigtail optical fiber of several ten cm is connected to the planar lightwave circuit with a UV adhesive. In the case of being automatically mounted at a high speed on the printed circuit board by general-purpose SMT, such a long pigtail optical fiber hinders the operation of the device. Further, the coating of the general-purpose connected pigtail optical fiber and a connector portion do not have heat resistance to withstand the reflow furnace at 260° C. Accordingly, in a state where the optical fiber is connected to the planar lightwave circuit of the optical module, it is difficult to realize the mounting method excellent in mass productivity by the SMT and reflow mounting technology.

In related art, in an optical waveguide of the planar lightwave circuit and a core wire of the optical fiber, the connection position is aligned on a six-axis alignment device with accuracy of 1 μm or less, and both are fixed with a UV adhesive. A process is also considered which connects the optical waveguide of the planar lightwave circuit and the position of the optical fiber by active alignment after the optical device is mounted on the printed circuit board. However, it is difficult to fix the printed circuit board to the alignment device, and it is difficult to perform accurate alignment in a state where a plurality of chips are mounted.

Means for Solving the Problem

An object of the present invention is to provide an optical fiber connection component in which an optical waveguide of a planar lightwave circuit and an optical fiber can be connected after a process using SMT and reflow mounting technology and to provide an optical device manufacturing method in which the optical device can be reduced in cost and improved in mass productivity.

In order to achieve the object, one embodiment of the optical fiber connection component of the present invention includes: a plurality of fiber guide holes into which optical fibers are insertable at intervals equal to intervals of a plurality of optical waveguides of a planar lightwave circuit; and grooves for demarcating an area provided with the plurality of fiber guide holes and an area coated with an adhesive in an end surface to be joined with the planar lightwave circuit. The plurality of optical waveguides and the plurality of fiber guide holes are respectively aligned and fixed to the planar lightwave circuit with the adhesive in advance.

One embodiment of a manufacturing method of an optical device includes: a first step of fixing an optical fiber connection component to the planar lightwave circuit with the adhesive in a state where the plurality of optical waveguides are respectively aligned with the plurality of fiber guide holes, the optical fiber connection component having a plurality of fiber guide holes into which optical fibers are insertable at intervals equal to intervals of a plurality of optical waveguides of a planar lightwave circuit included in an optical module mounted on a BGA package; a second step of mounting the planar lightwave circuit on the BGA package to form the optical module; a third step of mounting the optical module on a PCB by SMT and fixing the optical module by reflow mounting technology; and a fourth step of inserting the optical fibers into the plurality of respective fiber guide holes of the optical fiber connection component.

Effects of the Invention

According to the present invention, by using the optical fiber connection component having the plurality of fiber guide holes into which the optical fibers can be inserted, the optical waveguide of the planar lightwave circuit and the optical fiber can be connected after the process using the SMT and the reflow mounting technology. As a result, the optical device mounted with the optical module can be fully automatically mounted at a high speed, and the optical device can be reduced in cost and improved in mass productivity.

BRIEF DESCRIPTION OF DRAWINGS

FIG. 8 is a diagram illustrating a method of connecting the optical fibers by using the connection component according to the second embodiment.

DESCRIPTION OF EMBODIMENTS

Hereafter, the embodiments of the present invention are described in detail with reference to the drawings. In this embodiment, a connection component of a receptacle structure capable of connecting optical fibers afterward is connected and fixed to an input/output part of a planar lightwave circuit by active alignment. Thereafter, an optical device is mounted on a printed circuit board (PCB) by general-purpose SMT and fixed by a reflow furnace. Then, the optical fibers are inserted into the connection component and connected to the planar lightwave circuit without performing alignment (no alignment). In this embodiment, a coherent receiver for connecting multi-core optical fibers is described as an example. However, the embodiments can be applied to an optical module which is connected with an optical receiver for connecting single-core optical fibers, an optical transmitter mounted with a light source, and in addition, another optical component such as an optical modulator through the optical fiber.

First Embodiment (Optical Fiber Connection Component)

Figure 1:
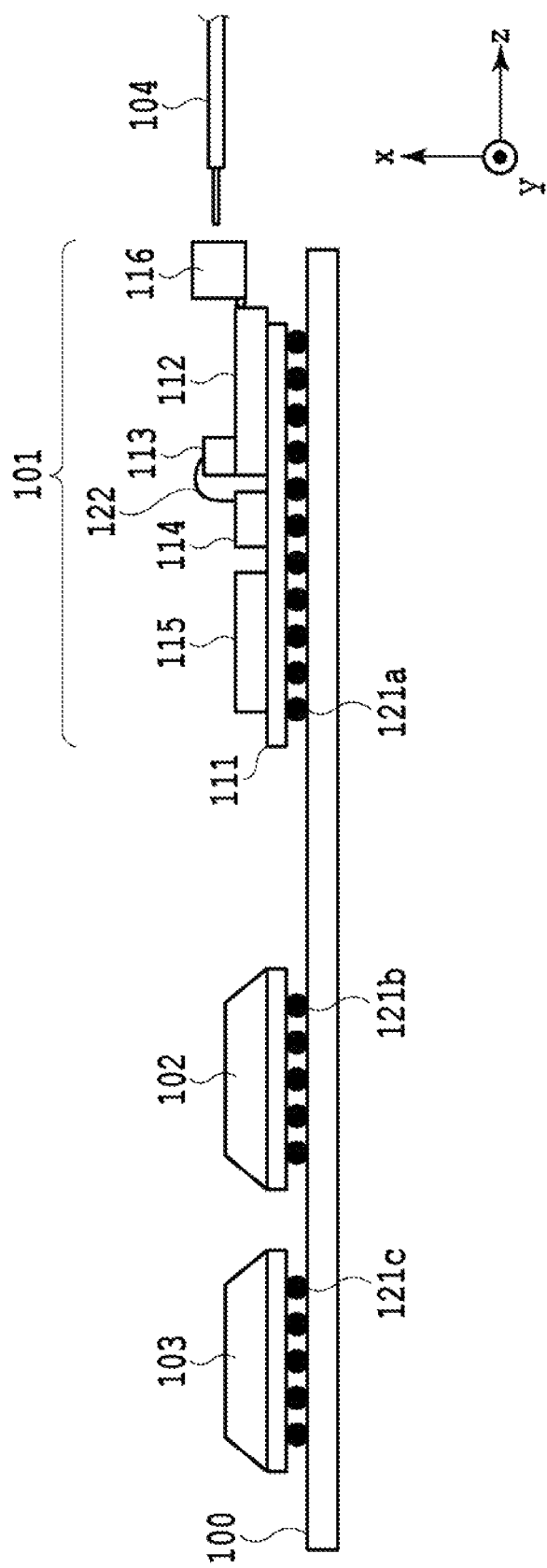
FIG. 1 is a diagram illustrating a structure of a coherent receiver according to a first embodiment of the present invention.

FIG. 1 illustrates a structure of a coherent receiver according to a first embodiment of the present invention. In the coherent receiver, an optical module 101 housed in a BGA package and digital signal processors (DSP) 102 and 103 for signal processing and external interfaces are mounted on a printed circuit board (PCB) 100. The optical module 101 and the DSPs 102 and 103 are fixed to the PCB 100 by solder balls 121a to 121c by using reflow mounting technology.

In the optical module 101, a quartz-based planar lightwave circuit 112 mounted with a high speed photo-diode (PD) array 113, a trans impedance amplifier (TIA) 114 for amplifying the electric signal output of the PD, and a DSP 115 for signal processing are mounted on the BGA package 111. Each of these components is fixed onto the BGA package 111 with an adhesive excellent in heat resistance. The planar lightwave circuit 112 includes a 90° hybrid optical circuit, a polarization multiplexer/demultiplexer, and the like. The PD array 113 is mounted on the planar lightwave circuit 112 and is connected to a TIA 114 through a wire bonding 122.

A connection component 116 into which three optical fibers 104 can be inserted is connected to the input/output part of the planar lightwave circuit 112 with a UV adhesive.

Figure 2:
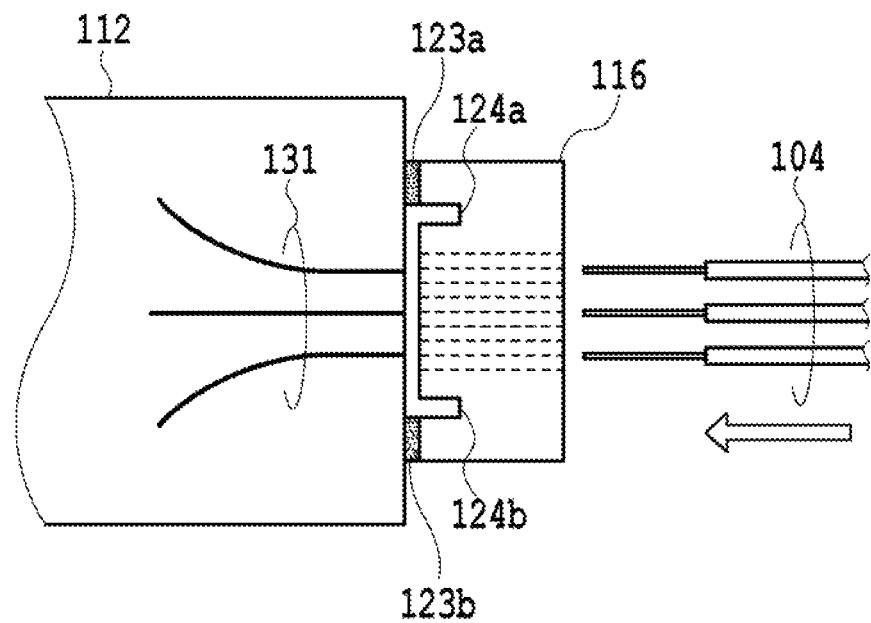
FIG. 2 is an enlarged view of a connection portion between a planar lightwave circuit and an optical fiber in the first embodiment.
Figure 2:
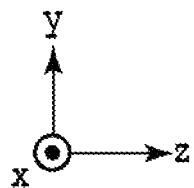

FIG. 2 is an enlarged view of a connection portion between the planar lightwave circuit and the optical fiber. An optical axis direction of the optical fiber is defined as a z-axis, a vertical direction of the planar lightwave circuit 112 perpendicular to the optical axis is defined as an x-axis, and a horizontal direction of the planar lightwave circuit 112 is defined as a y-axis. In the input/output part of the planar lightwave circuit 112, three optical waveguides 131 are exposed to an end surface (xy plane) of the planar lightwave circuit 112. The connection component 116 for the optical fiber is connected to the end surface with UV adhesives 123a and 123b.

In the end surface of the connection component 116, grooves 124a and 124b cut in an x-axis direction demarcate an area provided with a plurality of fiber guide holes and an area coated with the UV adhesives 123a and 123b as described below. The optical fiber 104 is inserted after fixing the connection component 116 to the planar lightwave circuit 112 in advance. Thus, the UV adhesive is prevented from flowing into a portion where the end surface of the optical waveguide 131 and the end surface of the optical fiber 104 abut on each other.

The optical module 101 mounted with the planar lightwave circuit 112 to which the connection component 116 is fixed is mounted on the PCB 100 by general-purpose SMT and are fixed by the reflow furnace. Then, a bare fiber portion of the optical fiber 104 is inserted into the connection component 116 in the direction of an arrow in the drawing. In a state where the end surface of the optical waveguide 131 and the end surface of the optical fiber 104 abut on each other, the coating of the optical fiber 104 and the connection component 116 are fixed with an adhesive.

Figure 3:
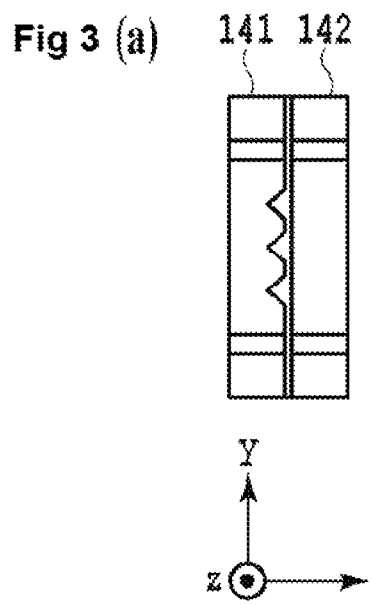
FIG. 3 is a diagram illustrating a connection component of the optical fiber according to the first embodiment.
Figure 3B:
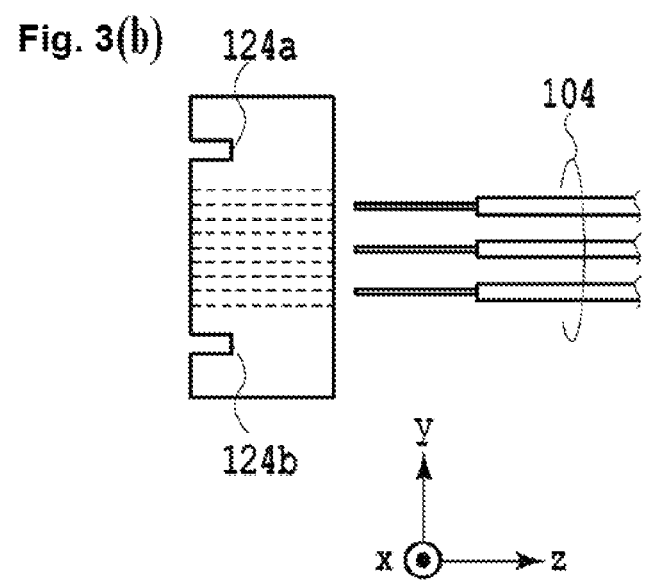
Figure 3:
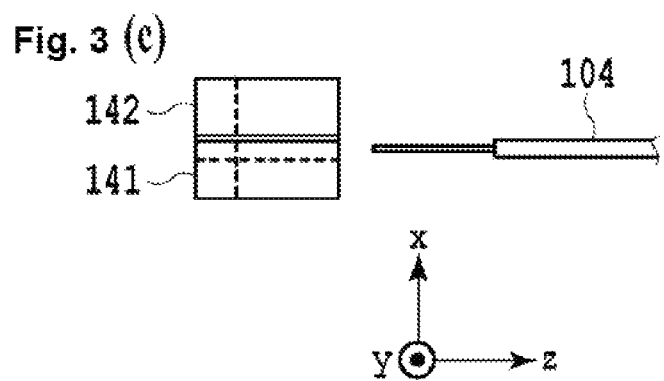

FIG. 3 is three-side views illustrating the connection component for the optical fiber. FIG. 3(a) is a front view facing the input/output part of the planar lightwave circuit 112. FIG. 3(b) is a top view, and FIG. 3(c) is a side view. In the connection component 116, a lower glass plate 141 having a size of 5 mm×3 mm and a thickness of 1.5 mm and an upper glass plate 142 having the same size of 5 mm×3 mm and a thickness of 1.5 mm are joined together with a UV adhesive. In the lower glass plate 141, three V-grooves having a pitch of 0.125 mm, a width of 230 µm, and a depth of 200 µm are formed on one surface. The pitch of the V-groove in the y-axis direction is formed so as to match the pitch of the optical waveguide 131 of the planar lightwave circuit 112. By joining the lower glass plate 141 and the upper glass plate 142, the fiber guide hole into which the optical fiber can be inserted is formed, and the bare fiber portion of the inserted optical fiber 104 is held between the V-groove and the upper glass plate 142.

The bare fiber can be inserted into the fiber guide hole, and further, two V-grooves are formed on both sides of the three V-grooves in order to reliably hold the bare fiber. In the joining of the lower glass plate 141 and the upper glass plate 142, the size of the fiber guide hole formed by the V-groove and the upper glass plate 142 changes depending on the thickness of the adhesive. In this regard, when the lower glass plate 141 and the upper glass plate 142 are joined, bare fibers are held in two V-grooves in advance. Thus, the size of the fiber guide hole, that is, the interval between the lower glass plate 141 and the upper glass plate 142 can be set to the interval suitable for insertion and holding of the bare fiber.

Incidentally, in the first embodiment, an example is described in which the optical fiber is held by a V-groove substrate (lower glass plate) and a presser plate (upper glass plate). However, instead of the V-groove, a square cross-sectional shape of the groove or a semicircular groove may be used. Further, the configuration may be made such that a hole into which the optical fiber can be inserted is provided in a glass block. Accordingly, the optical fiber connection component may be used as long as the component has the fiber guide holes into which the optical fibers can be inserted at intervals equal to the intervals of a plurality of optical waveguides of the planar lightwave circuit 112.

(Connection Method of Optical Fiber)

First, a process of connecting the planar lightwave circuit 112 and the connection component 116 is described. The planar lightwave circuit 112 and the connection component 116 with the inserted optical fibers 104 are fixed on the alignment device. An optical signal is input to the optical fiber 104, and alignment is made to have a maximum signal strength while monitoring the received signal output from the optical module 101 (active alignment). Thereafter, the UV adhesives 123a and 123b are applied to the outside of the grooves 124a and 124b of the end surface of the connection component 116 and then irradiated with UV light to harden. Finally, the optical fiber 104 is removed, and the planar lightwave circuit 112 and the connection component 116 are fixed in a state where the optical waveguide of the planar lightwave circuit 112 and the fiber guide hole of the connection component 116 are aligned.

Next, the planar lightwave circuit 112, the TIA 114, and the DSP 115 are fixed on the BGA package 111, and the PD array 113 and the TIA 114, the electrode of the TIA 114 and the electrode pad of the surface of the BGAA package 111, and the like are connected by the wire bonding 122. In this way, the optical module 101 mounted with the planar lightwave circuit 112 and the component such as the DSPs 102 and 103 are mounted on the PCB 100 by general-purpose SMT and is fixed by the reflow furnace. Thereafter, the optical fiber 104 is inserted into the connection component 116, and the optical fiber 104 is fixed with a UV adhesive in a state where the end surface of the bare fiber of the optical fiber abuts on the end surface of the planar lightwave circuit 112.

In this way, the optical connection component aligned with high accuracy by active alignment is fixed to the planar lightwave circuit. Thus, even when the optical fiber is inserted later without alignment, the optical connection with the connection position is made possible.

(Evaluation)

Figure 4:
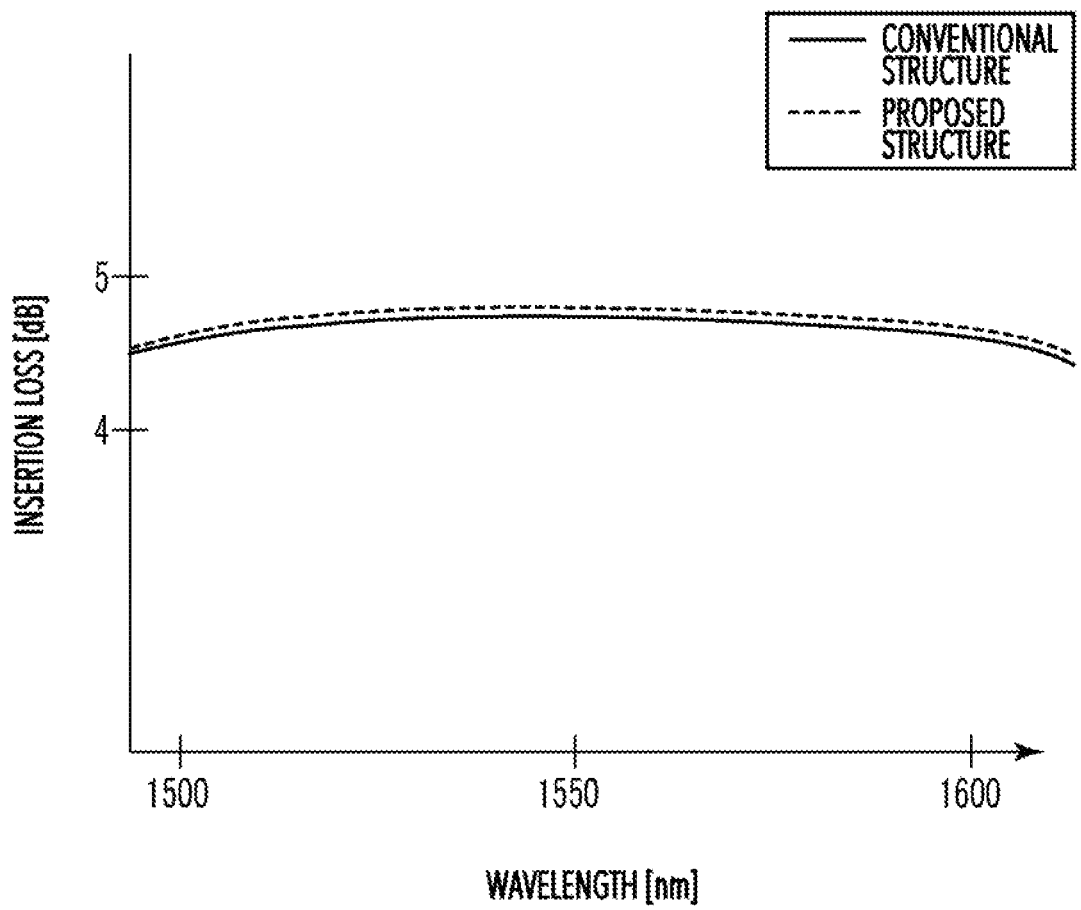
FIG. 4 is a diagram illustrating a measurement result of optical characteristics of the coherent receiver of the first embodiment.

FIG. 4 illustrates the measurement result of the optical characteristics of the coherent receiver of the first embodiment. The optical characteristics are measured in the optical module assembled as described above, and, for comparison, in the optical module assembled by connecting the conventional optical fiber array to the planar lightwave circuit. According to this embodiment, an insertion loss in a wavelength λ of 1550 nm is 4.5 dB. In the optical module attached with the conventional pigtail optical fiber, the insertion loss in the wavelength λ of 1550 nm is 4.6 dB. Therefore, it is confirmed that the connection is made with the same connection loss as the conventional one.

On the basis of the above results, it is confirmed that the connection form of this embodiment is adapted also to a digital coherent receiver without any problem. It is confirmed that the connection loss does not change between a case where the optical fiber array is connected to the optical waveguide after the active alignment and a case where the optical fiber guide is connected first, and the fiber is connected after reflow without alignment as in this embodiment. As a result, the optical module having the same optical characteristics as those of the conventional one, especially the excellent characteristics of the optical connection part can be realized while realizing the mounting method excellent in mass productivity by SMT and reflow mounting technology.

Second Embodiment (Optical Fiber Connection Component)

In a second embodiment, an optical module having a connection component facilitating multi-core optical fiber connection is further described. In an optical switch module, in many cases, many optical fibers are connected to the input/output part of the planar lightwave circuit. For example, in a 16×16 optical switch, thirty-two cores of optical fibers are connected, and the connection efficiency is considerably poor in the method of inserting the optical fibers one by one into the connection component of the first embodiment. In this regard, in the second embodiment, an optical fiber connection component capable of collectively connecting the multi-core optical fibers is described.

Figure 5:
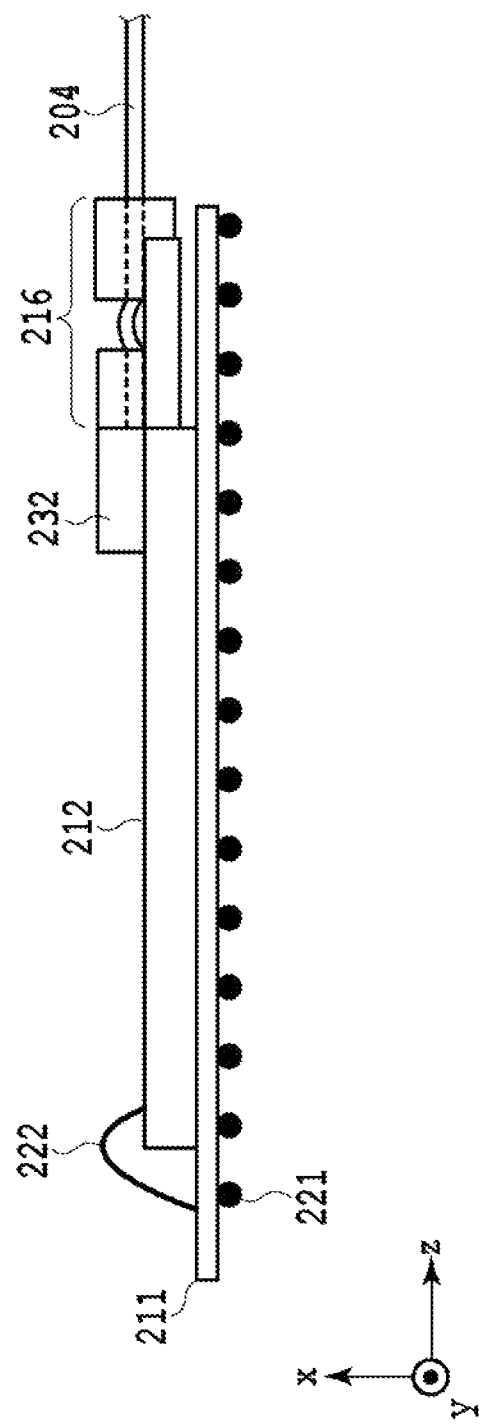
FIG. 5 is a diagram illustrating a structure of a multicast optical switch according to a second embodiment of the present invention.

FIG. 5 illustrates a structure of a multicast optical switch according to the second embodiment of the present invention. In the multicast optical switch, a 16×16 multicast optical switch configured of a quartz-based planar lightwave circuit 212 of 20 mm×50 mm is fixed on a general-purpose BGA package 211 having a size of 30 mm×50 mm. The electrode pad on the planar lightwave circuit 212 and the electrode pad on the BGA package 211 are connected by the wire bonding 222.

A total of thirty-two input waveguides and output waveguides are included in the 16×16 multicast optical switch. In addition, two loop waveguides for alignment at the time of connecting the optical module and the optical fiber may be added for input and output. The end surfaces of these input/output waveguides and the loop waveguides are exposed to the end surface (xy plane) of the planar lightwave circuit 212. A connection component 216 capable of collectively inserting and connecting thirty-two cores of optical fibers is connected to the end surface with a UV adhesive. Incidentally, a roof plate 232 is a reinforcing member for enlarging an adhesion area for fixing the planar lightwave circuit 212 and the connection component 216.

The connection component 216 is configured by connecting a receptacle component and a pluggable component, which are described in order below.

Figure 6A:
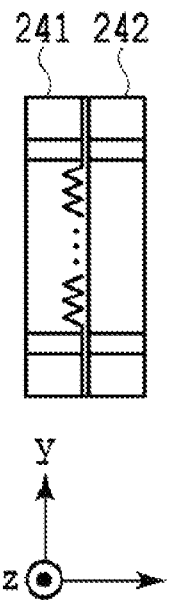
FIG. 6 is a diagram illustrating a receptacle component of a connection component according to the second embodiment.
Figure 6B:
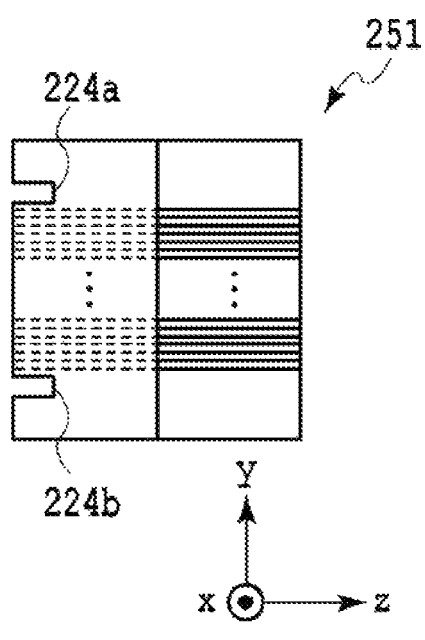
Figure 6C:
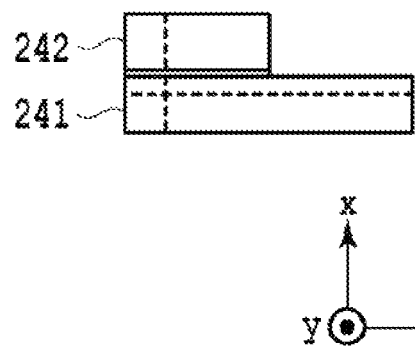

FIG. 6 illustrates the receptacle component of the connection component according to the second embodiment. FIG. 6(a) is a front view facing the input/output part of the planar lightwave circuit 212. FIG. 6(b) is a top view. FIG. 6(c) is a side view. In the receptacle component 251, a lower glass plate 241 having a size of 5 mm×5 mm and a thickness of 1.5 mm and an upper glass plate 242 having a size of 5 mm×2 mm, a thickness of 1.5 mm, and a short length in the optical axis (z-axis) direction of the optical fiber are fixed with a UV adhesive. In the lower glass plate 241, thirty-four V-grooves having a width of 230 μm and a depth of 200 μm are formed on one surface. The pitch of the V-groove in the y-axis direction is formed so as to match the pitch of the input/output waveguide of the planar lightwave circuit 212. By joining the lower glass plate 241 and the upper glass plate 242, the fiber guide hole into which the optical fiber can be inserted is formed, and the bare fiber portion of the inserted optical fiber 204 is held between the V-groove and the upper glass plate 142.

Similarly to the first embodiment, grooves 224a and 224b formed by cutting the end surface of the receptacle component 251 in the x-axis direction demarcate an area provided with a plurality of fiber guide holes and an area coated with a UV adhesive. Thus, the UV adhesive is prevented from flowing into a portion where the end surface of the optical waveguide and the end surface of the optical fiber 204 abut on each other. The receptacle component 251 manufactured in this way is fixed to the end surface of the planar lightwave circuit 212.

Figure 7A:
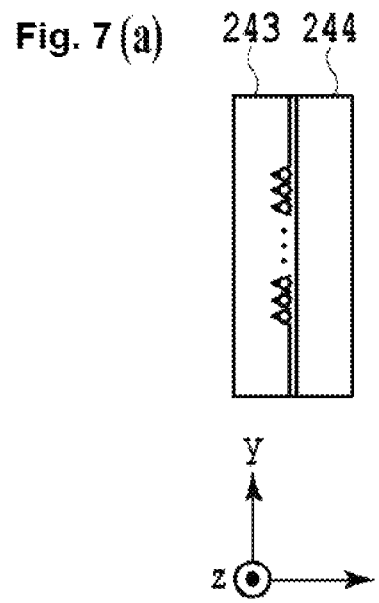
FIG. 7 is a diagram illustrating a pluggable component of the connection component according to the second embodiment.
Figure 7B:
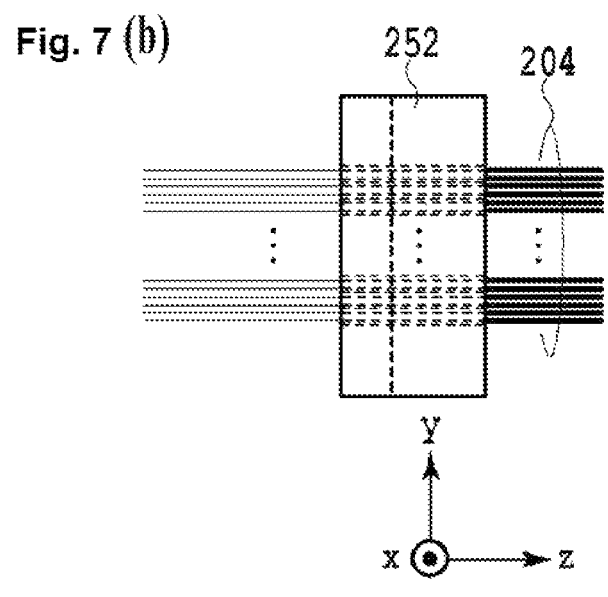
Figure 7C:
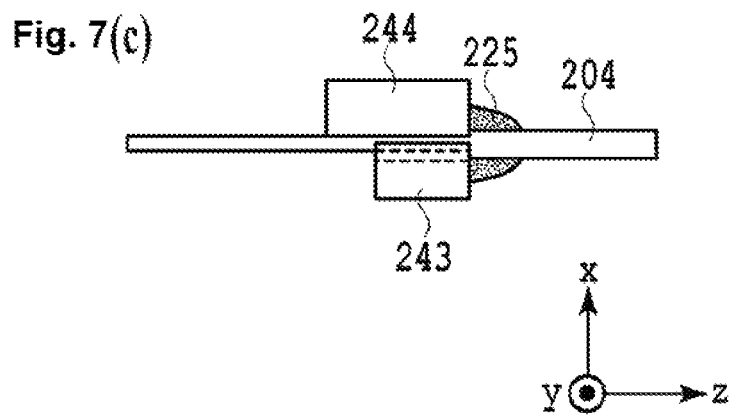

FIG. 7 illustrates the pluggable component of the connection component according to the second embodiment. FIG. 7(a) is a front view facing the receptacle component. FIG. 7(b) is a top view. FIG. 7(c) is a side view. In the pluggable component 252, a lower glass plate 243 having a size of 5 mm×2 mm and a thickness of 1.5 mm and an upper glass plate 244 having a size of 5 mm×3 mm, a thickness of 1.0 mm, and a long length in the optical axis (z-axis) direction of the optical fiber are fixed with a UV adhesive. In the lower glass plate 243, thirty-four V-grooves having a width of 230 μm and a depth of 200 μm are formed on one surface. The pitch of the V-groove is formed so as to match the pitch of the V-groove of the receptacle component 251.

Thirty-two bare fibers obtained by removing the coating of the optical fibers 204 are inserted into the V-grooves and are held by the V-grooves and the upper glass plate 244. As illustrated in FIG. 7(c), the upper glass plate 244 is fixed so as to protrude in the direction of the planar lightwave circuit 212 by 1 mm from the lower glass plate 243 in the optical axis direction of the optical fiber. Further, thirty-two bare fibers are fixed so as to protrude by about 5 mm from the upper glass plate 244 in the direction of the planar lightwave circuit 212.

Incidentally, on the opposite side of the surface where the bare fiber protrudes, the coating of the optical fiber 204, the lower glass plate 243, and the upper glass plate 244 are fixed by a silicone-based soft adhesive 225, thereby protecting the boundary between the bare fiber and the coated fiber.

When the pluggable component 252 manufactured in this way is connected to the receptacle component 251 fixed to the optical module, the optical fiber arrays of thirty-two cores are connected collectively to form the structure of the connection component 216 illustrated in FIG. 4.

(Connection Method of Optical Fiber)

FIG. 8 illustrates a method of connecting the optical fibers by using the connection component according to the second embodiment. First, a process of connecting between the planar lightwave circuit 212 and the receptacle component 251 is described. The planar lightwave circuit 212 and the receptacle component 251 are fixed on the alignment device. A fiber for alignment is inserted into the V-groove facing the input side of the loop waveguide of the planar lightwave circuit 212, and an optical signal is input. Alignment is made to have a maximum signal strength while monitoring the received signal output from the output side of the loop waveguide (active alignment). Thereafter, the UV adhesive is applied to the outside of the grooves 224a and 224b of the end surface of the receptacle component 251 and then irradiated with UV light to harden. Finally, the fiber for alignment is removed (FIGS. 8(a) and 8(b)).

Next, thirty-two bare fibers are arranged along the V-grooves of the lower glass plate 241 of the receptacle component 251, and the bare fibers of the pluggable component 252 are inserted into the receptacle component 251. The end surface of the lower glass plate 241 of the receptacle component 251 and the end surface of the lower glass plate 243 of the pluggable component 252 abut on each other and are fixed with a UV adhesive (FIGS. 8(c) and 8(d)). That is, the V-grooves of the lower glass plate 241 and the V-grooves of the lower glass plate 243 are aligned and joined. In a state where the end surfaces abut on each other, a buckling gap 253, that is, a space which allows the optical fiber inserted into the V-groove of the lower glass plate 241 to be bent upward of the substrate is formed between the upper glass plate 242 of the receptacle component 251 and the upper glass plate 244 of the pluggable component 252.

The protrusion amount of thirty-two bare fibers held by the pluggable component 252 from the upper glass plate 244 in the direction of the planar lightwave circuit 212 has variations of about several μm. Even when the connection interval between the end surface of the optical fiber and the end surface of the planar lightwave circuit is shifted by several μm, variations occur in the connection loss of about 0.1 dB. In this regard, the buckling gap 253 is provided to allow the bare fibers to be bent appropriately. Thus, all the end surfaces of the thirty-two cores of bare fibers can abut on the end surface of the input/output part of the planar lightwave circuit. Accordingly, it is possible to prevent variations in connection loss at the connection end surface.

An adhesive surface can be formed between the lower glass plate 241 of the receptacle component 251 and the lower glass plate 243 and the upper glass plate 244 of the pluggable component 252, thereby improving reliability.

(Evaluation)

The optical transmitter and the optical receiver are connected with the optical module assembled as described above to measure characteristics of the multicast optical switch. The 16-channel connection loss average is 0.3 dB/point, and the loss variation is 0.05 dB. It is confirmed that a connection loss value and a value of loss variation are equivalent to those of the optical module assembled by connecting the conventional optical fiber array to the planar lightwave circuit.

EFFECT OF THIS EMBODIMENT

According to this embodiment, the general-purpose SMT and the reflow technology can be used, and similarly to the electronic device, the optical device in which the optical module including the planar lightwave circuit is mounted on the BGA package can be fully automatically mounted on the PCB at a high speed. Accordingly, the electronic devices and the optical devices can be densely mounted on one PCB.

Since the optical fiber may be inserted after the optical device is manufactured, the conveyance of the PCB on a manufacturing line is facilitated in a manufacturing process of the optical device. In addition, the packing of the optical device is facilitated and efficiency in a distribution process is improved.

Conventionally, the fiber array connected to the planar lightwave circuit is polished by aligning a glass block part and the fiber end surface, but such a polishing process is not required.

REFERENCE SIGNS LIST

100 Printed circuit board (PCB)
101 Optical module
102,103,115 DSP
104,204 Optical fiber
111,211 BGA package
112,212 Quartz-based planar lightwave circuit
113 PD array
114 TIA
116 Connection component
121,221 Solder balls
122,222 Wire bonding
123,223 UV adhesive
124,224 Groove
131 Optical waveguide
141,241,243 Lower glass plate
142,242,244 Upper glass plate
225 Adhesive
232 Roof plate
251 Receptacle component
252 Pluggable component
253 Buckling gap

The invention claimed is:

1. An optical fiber connection component for connecting a plurality of optical waveguides of a planar lightwave circuit and a plurality of respective optical fibers, comprising:
   a receptacle component having a plurality of fiber guide holes into which the plurality of optical fibers are insertable, the fiber guide holes formed by joining a first lower substrate formed with a plurality of V-grooves into which the optical fibers are insertable at intervals equal to intervals of the plurality of optical waveguides and a first upper substrate having a short length in an optical axis direction of the optical fiber; and
   a pluggable component having a plurality of fiber guide holes into which the plurality of optical fibers are insertable, the fiber guide holes formed by joining a second lower substrate formed with a plurality of V-grooves into which the optical fibers are insertable at intervals equal to the intervals of the plurality of optical waveguides and a second upper substrate having a long length in the optical axis direction of the optical fiber,
   wherein, in case that the V-grooves of the first lower substrate and the V-grooves of the second lower substrate are aligned and joined, a space which allows the optical fibers inserted into the V-grooves of the first lower substrate to be bent is formed between the first upper substrate and the second upper substrate.

2. The optical fiber connection component according to claim 1, wherein the receptacle component includes grooves for demarcating an area provided with the plurality of fiber guide holes and an area coated with an adhesive in end surfaces of the first lower substrate and the first upper substrate to be joined with the planar lightwave circuit; and
   the plurality of optical waveguides and the plurality of fiber guide holes are respectively aligned and fixed to the planar lightwave circuit with the adhesive in advance.

* * * * *